(12) United States Patent
Hogan et al.

(10) Patent No.: US 11,656,759 B2
(45) Date of Patent: May 23, 2023

(54) SEMITRANSPARENT TACTILE SURFACE SENSOR AND A METHOD OF SENSING AN INTERACTION WITH AN OBJECT USING THE SEMITRANSPARENT TACTILE SURFACE SENSOR

(71) Applicant: SAMSUNG ELECTRONICS CO., LTD., Suwon-si (KR)

(72) Inventors: Francois Hogan, St-Jean-sur-Richelieu (CA); Michael Jenkin, Toronto (CA); Gregory Lewis Dudek, Westmount (CA); Yogesh Girdhar, Falmouth, MA (US); Sahand Rezaei-Shoshtari, Montreal (CA); David Meger, Montreal (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 352 days.

(21) Appl. No.: 17/139,642

(22) Filed: Dec. 31, 2020

(65) Prior Publication Data

US 2021/0389872 A1 Dec. 16, 2021

Related U.S. Application Data

(60) Provisional application No. 63/075,534, filed on Sep. 8, 2020, provisional application No. 63/037,566, filed on Jun. 10, 2020.

(51) Int. Cl.
*G06F 3/04883* (2022.01)
*G06N 20/20* (2019.01)
*G06F 3/041* (2006.01)

(52) U.S. Cl.
CPC ...... *G06F 3/04883* (2013.01); *G06F 3/04164* (2019.05); *G06N 20/20* (2019.01)

(58) Field of Classification Search
CPC . G06F 3/04883; G06F 3/04164; G06N 20/20; B25J 9/163
See application file for complete search history.

(56) References Cited

FOREIGN PATENT DOCUMENTS

JP 2010-190770 A 9/2010

*Primary Examiner* — Mark Edwards
*Assistant Examiner* — Chayce R Bibbee
(74) *Attorney, Agent, or Firm* — Sughrue Mion, PLLC

(57) ABSTRACT

A method of sensing an interaction with an object using a semitransparent tactile surface (STS) sensor having an image sensor and a semitransparent membrane includes capturing, by the image sensor, a stream of images; separating the stream of images into a visual stream including light traveling through the semitransparent membrane and a tactile stream including light reflecting off of the semitransparent membrane; and processing the visual stream and tactile stream through a multimodal deep neural network.

19 Claims, 14 Drawing Sheets

SEMITRANSPARENT TACTILE SURFACE SENSOR AND A METHOD OF SENSING AN INTERACTION WITH AN OBJECT USING THE SEMITRANSPARENT TACTILE SURFACE SENSOR

CROSS-REFERENCE TO RELATED APPLICATION(S)

This application is based on and claims priority under 35 U.S.C. § 119 to U.S. Provisional Patent Application No. 63/037,566, filed on Jun. 10, 2020, in the U.S. Patent & Trademark Office, and U.S. Provisional Patent Application No. 63/075,534, filed on Sep. 8, 2020, in the U.S. Patent & Trademark Office the disclosures of which are incorporated by reference herein in their entirety.

BACKGROUND

1. Field

The disclosure relates to tactile and visual sensors, and more particularly to a semitransparent tactile sensor capable of tactile and visual sensing, and a method of sensing an interaction with an object using the semitransparent sensor.

2. Description of Related Art

Tactile sensors capture fundamental properties about the physical interaction between objects, including the contact shape, texture, stiffness, temperature, vibration, shear and normal forces. Tactile sensors have found wide application in teleoperation and autonomous robotic manipulation tasks in which the tactile sensor is used to inform and monitor the interaction between the robot's end-effector and the manipulated objects. Optical tactile sensors use a combination of a light source and a detector, typically a camera, to capture the contact interface. A property of many existing tactile sensors is that they are opaque and thus obscure the view of the objects just at the critical moment prior to manipulator-object contact. The opaque nature of the tactile sensor prevents vision-based sensors to capture 'in the hand' prospective views of the objects just prior to the moment of contact.

In addition, commonly used grasping sensors may not be capable of precisely interacting with object due to a lack of feedback regarding a change in three-dimensional pose of the object. FIG. 15 shows possible outcomes of a physical interaction with an object. As shown in FIG. 15, the object may topple or translate depending on characteristics such as friction between the object and supporting surface, center of mass of the object, and stability of the object which may not be known by a robotic or autonomous device that is interacting with the device. Accordingly, being able to predict the a future configuration of an object during an interaction with the object may provide for more precise control of the object by a robotic or autonomous device.

SUMMARY

According to an aspect of the disclosure, a method of sensing an interaction with an object using a semitransparent tactile surface (STS) sensor having an image sensor and a semitransparent membrane may include capturing, by the image sensor, a stream of images; separating the stream of images into a visual stream including light traveling through the semitransparent membrane and a tactile stream including light reflecting off of the semitransparent membrane; and processing the visual stream and tactile stream through a multimodal deep neural network.

According to another aspect of the disclosure, a robotic device may include a semitransparent tactile surface (STS) sensor comprising an image sensor and a semitransparent membrane; a memory sorting instructions; and a processor configured to execute the instructions to: capture, by the image sensor, a stream of images; separate the stream of images into a visual stream including light traveling through the semitransparent membrane and a tactile stream including light reflecting off of the semitransparent membrane; and process the visual stream and tactile stream through a multimodal deep neural network.

According to another aspect of the disclosure, a non-transitory computer readable medium may store instructions, the instructions may include one or more instructions that, when executed by one or more processors of a robotic device comprising a semitransparent tactile surface (STS) sensor, cause the one or more processors to: capture, by an image sensor of the STS sensor, a stream of images; separate the stream of images into a visual stream including light traveling through a semitransparent membrane of the STS sensor and a tactile stream including light reflecting off of the semitransparent membrane; and process the visual stream and tactile stream through a multimodal deep neural network.

According to another aspect of the disclosure, a semitransparent tactile surface (STS) sensor may include a transparent gel layer having an upper surface and a lower surface; a semitransparent layer disposed on the upper surface of the transparent gel layer; a tactile light source provided below the semitransparent layer, the semitransparent layer being configured to reflect light emitted by the tactile light source; a visual light source configured to emit light to an object provided above the semitransparent layer, the semitransparent layer being configured to transmit light emitted by the visual light source; and an image sensor provided below the transparent gel layer. The image sensor may be configured to capture images of the semitransparent layer during periods of light emission by the tactile light, and the image sensor is configured to capture images through the semitransparent layer during periods of light emission by the visual light source.

According to another aspect of the disclosure, a method of operating a semitransparent tactile surface (STS) sensor having an image sensor, a semitransparent membrane, a tactile light source, and a visual light source, may include: periodically emitting light from the tactile light source, the semitransparent membrane being configured to reflect the light emitted by the tactile light source; periodically emitting light from the visual light source, the semitransparent membrane being configured to pass the light emitted by the visual light source; during time periods where the tactile light source emits light, capturing, by the image sensor, a tactile image stream of light reflecting off of the semitransparent membrane; and during time periods where the visual light source emits light, capturing, by the image sensor, a visual image stream of light traveling through the semitransparent membrane. The time periods of light emitted from the tactile light source and the time periods of the light emitted from the visual light source may be inversely related.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

Figure 1:
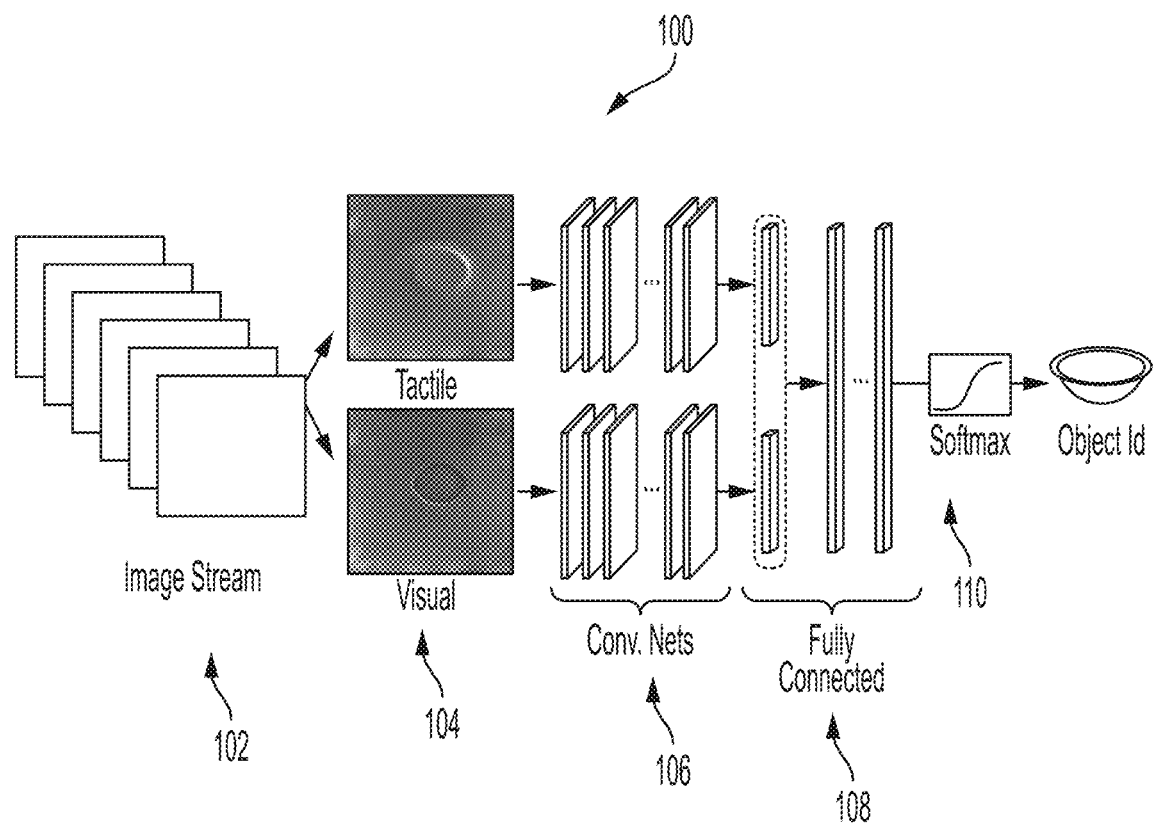
FIG. 1 is a diagram of an overview of a method 100 for sensing an interaction with an object using a semitransparent tactile surface (STS) sensor according to an embodiment.

FIG. 1 is a diagram of an overview of a method 100 for sensing an interaction with an object using a semitransparent tactile surface (STS) sensor according to an embodiment. The Semi-transparent tactile surface sensor may be a compliant tactile sensor capable of measuring both normal and shear forces of surface interactions while providing light-based observations of interactions with objects that are in close proximity or in contact with the STS interaction surface.

As shown in FIG. 1, at operation 102, an image sensor of the STS sensor may capture an image stream. The image sensor may be oriented to capture an image of the STS and well as an image through the STS.

At operation 104, the image stream may be separated into a tactile stream and a visual stream. The tactile stream may primarily capture light reflecting off of the STS and the visual stream may primarily capture light traveling through the STS. That is, a majority of light captured by the tactile stream may be reflected off of the semitransparent membrane and a majority of light captured by the visual stream may travel through the semitransparent membrane.

At operation 106, the tactile stream and the visual stream may each be processed by independent convolutional neural networks.

At operation 108, the outputs of the network processing the tactile stream and the network processing the visual stream may be concatenated and fed into a fully connected neural network.

At operation 110, a softmax layer of the fully connected neural network may predict the identify and class of an object that is interacting with the sensor.

Method 100 may provide for high resolution tactile information as well as unobstructed visual information of an object interacting with an STS sensor to be considered when identifying the object and detecting dynamic characteristics of the object.

Figure 2:
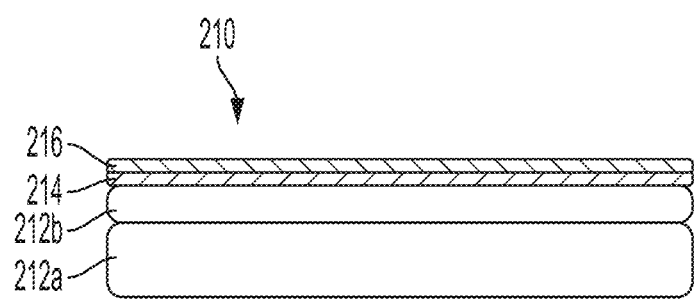
FIG. 2 is a diagram showing an semitransparent contact membrane of an STS sensor according to an embodiment.

FIG. 2 is a diagram showing an semitransparent contact membrane 210 of an STS sensor according to an embodiment.

As shown in FIG. 2, an inner layer of the semitransparent membrane 210 may be a transparent, gel membrane 212a, 212b. The gel membrane 212a, 212b may be a variable stiffness compliant membrane that includes an upper layer 212b of a soft gel and an lower layer 212a of a stiffer gel. By making the upper layer 212b of the gel membrane softer relative to the lower layer 212a, the sensitivity of the sensor may be increased by ensuring that small forces lead to deformations. By making the lower layer 212a from a stiffer gel than the upper layer 212b, the sensor may be able to capture a wider range of contact forces, where large contact forces result in deformation of the lower layer 212a.

A reflective layer 214 may be provided on an upper surface of the gel membrane 212a, 212b to provide the STS. The reflective layer 214 may include reflective paint, such as a paint used to turn clear glass into a mirror. According to a non-limiting example embodiment, the paint may be Rust-Oleum 267727.

The reflective paint may be applied as a thin coating on the upper surface of the gel membrane 212a, 212b. The thickness of the coating may be adjusted to control surface transmission characteristics of the STS. According to a non-limiting example embodiment, the surface transmission characteristics of the STS may be controlled such that the STS appears as transparent or translucent when the inside of the sensor is maintained dark relative to the exterior, and the STS appears opaque when the inside of the sensor is maintained bright relative to the exterior.

A protective layer 216 may be applied to an upper surface of the reflective layer 214 to protect the reflective layer from being damaged through physical interactions. The protective layer 216 may be selected to provide optical clarity to minimize an impact the optical clarity of the sensor and robustness to protect the reflective layer from wear. The protective layer 216 may also be thin and soft to minimize an impact on the sensitivity of the sensor by affecting the deformation of the STS. According to a non-limiting example embodiment, the protective layer may include a compound made out of 40% XP-595 optically clear silicone, 30% thinner (40117 by Silicones Inc.) and 30% silicone solvent (Si 479).

Figure 3A:
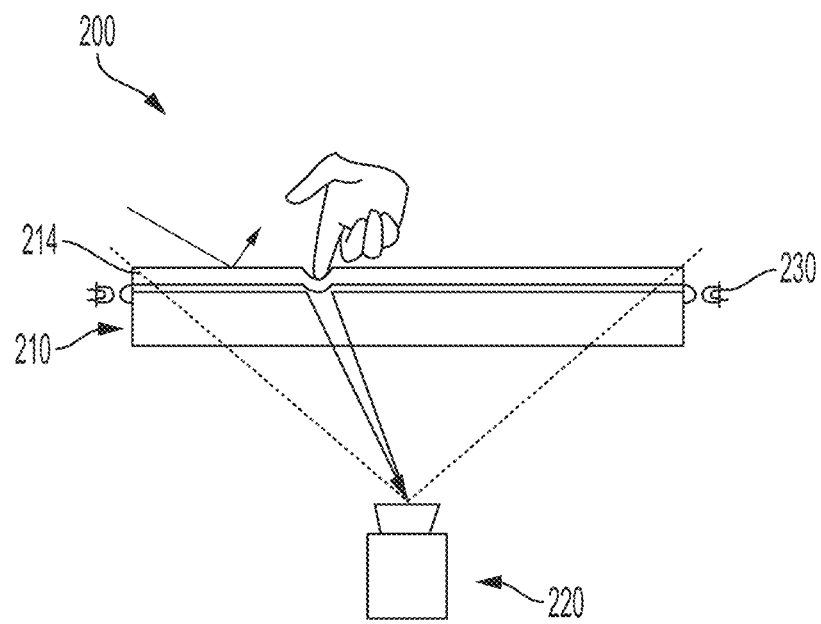
FIG. 3A is a diagram showing an STS sensor including the semitransparent membrane of FIG. 2 operating in a tactile modality according to an embodiment.
Figure 3B:
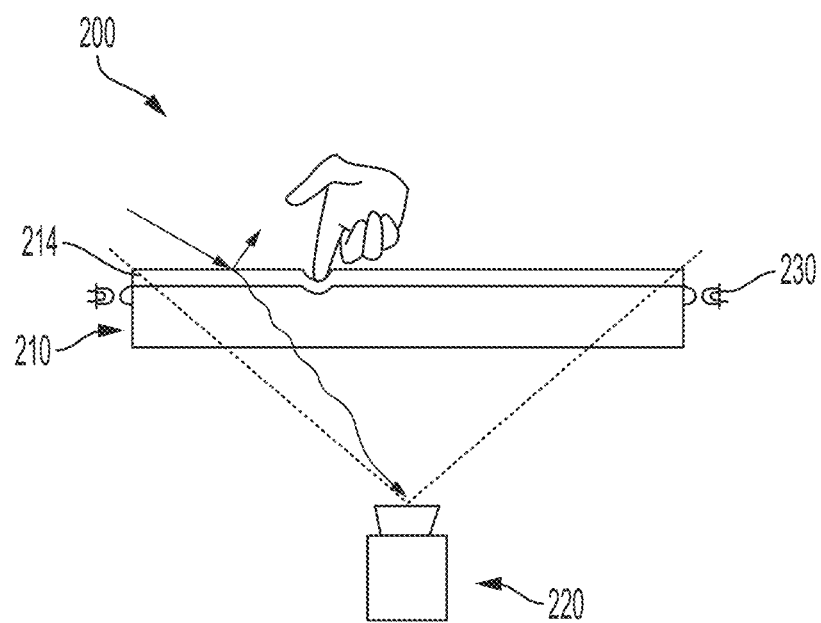
FIG. 3B is a diagram showing the STS sensor including the semitransparent membrane 210 of FIG. 2 operating in a visual modality according to an embodiment.

FIG. 3A is a diagram showing an STS sensor 200 including the semitransparent membrane 210 of FIG. 2 operating in a tactile modality according to an embodiment. FIG. 3B is a diagram showing the STS sensor 200 including the semitransparent membrane 210 of FIG. 2 operating in a visual modality according to an embodiment.

As shown in FIGS. 3A and 3B, the STS sensor 200 may include an semitransparent membrane 210 and an image sensor 220 provided below the semitransparent membrane 210 for imaging the semitransparent membrane 210 from below.

As shown in FIG. 3A, the STS sensor 200 may be in a tactile mode when an inside of the sensor 200 may be maintained lit relative to the surrounding environment. The inside of the sensor 200 may be maintained lit relative to the surrounding environment by light emitted from a tactile light source 230 provided below the STS provided by the reflective layer 214. The tactile light source 230 may be positioned and oriented to emit light that is reflected off of the STS. Accordingly, when in the tactile mode, the image sensor 220 may primarily capture light reflected off a bottom of the STS to provide tactile images. The image of light reflected off of the bottom of the STS may be used to determine a deformation of the STS. That is, normal and shear forces acting upon the contact surface of the STS sensor 200 may be determined through the distortions of the STS.

According to an embodiment, the tactile light source 230 may include one or more light emitting diodes (LEDs) positioned around a perimeter of the semitransparent membrane 210 that are oriented to emit light at an angle that is that is generally parallel with the STS. The LED lights of the tactile light source 230 may emit light of different colors to provide additional contrast to the image. For example, on a square STS sensor, the tactile light source 230 may emit different colors of light inward from each of the sides.

According to another embodiment, the tactile light source 230 may be provided below the semitransparent membrane 210. The light emitted from the LEDs may be diffused to flood an internal structure of the STS sensor 200 with light without producing a glare that may blind the image sensor 220.

As shown in FIG. 3B, the STS sensor 200 may be in a visual mode when an interior of the sensor is maintained dark relative to the surrounding environment. According to an embodiment, the tactile light 230 may not emitting light when the sensor is in a visual mode. Accordingly, when in the visual mode, the image sensor 220 may primarily capture light emitted through the semitransparent membrane 210. The light emitted through the semitransparent membrane 210 may be used to determine visual characteristics of an object on an opposing side of the semitransparent membrane 210.

Figure 4A:
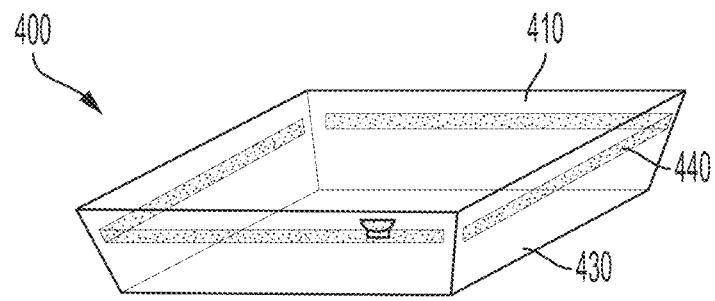
FIG. 4A shows an STS sensor having an oblique internal light source 440 as the visual light source according to an embodiment.
Figure 4B:
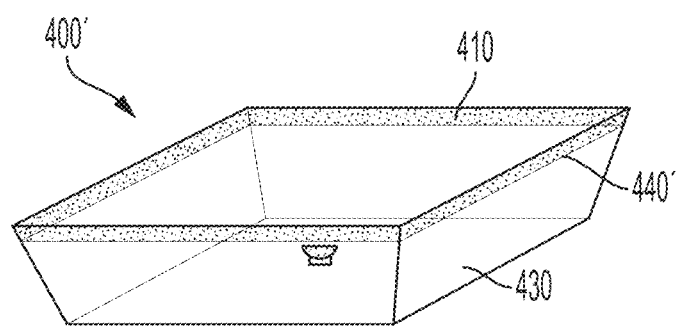
FIG. 4B shows an STS sensor 400' with an external light source 440' according to an embodiment.
Figure 5A:
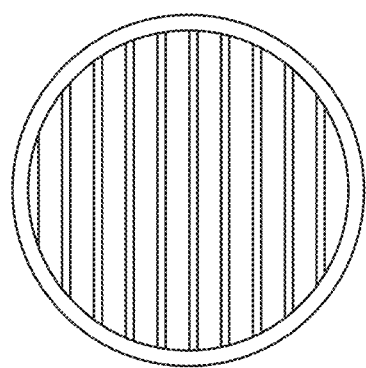
FIG. 5A shows a semitransparent membrane that may be included in an STS sensor according to another embodiment.
Figure 5B:
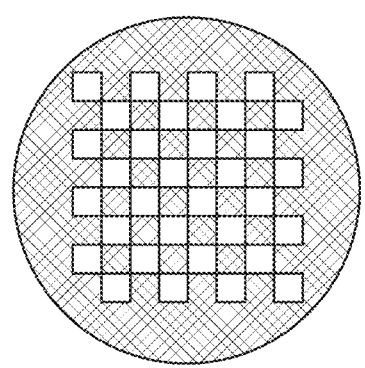
FIG. 5B shows a semitransparent membrane that may be included in an STS sensor according to another embodiment.
Figure 5C:
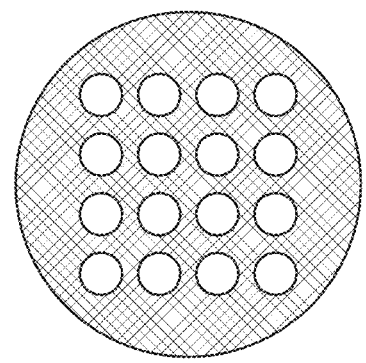
FIG. 5C shows a semitransparent membrane that may be included in an STS sensor according to another embodiment.
Figure 5D:
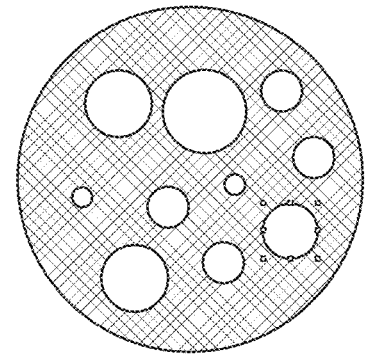
FIG. 5D shows a semitransparent membrane that may be included in an STS sensor according to another embodiment.

In order for the visual mode to be most effective, the interior of the sensor may be held dark while the exterior is bright. However, when objects are in close proximity to the STS sensor 200, their visual appearances may be obscured because they are backlit. FIGS. 4A and 4B show embodiments of visual light sources that may reduce the impact of object backlighting when the STS sensor 200 is operating in the visual light mode.

FIG. 4A shows an STS sensor 400 having an oblique internal light source 440 as the visual light source according to an embodiment. As shown in FIG. 4A, LED lights may be placed below STS of the semitransparent membrane 410 to provide the oblique internal light source 440. The LED lights may be directed to emit light at an angle relative to the STS so the emitted light will pass through the STS and not increase illumination within the STS sensor 400. The light that passes through the STS will illuminate an object near the STS sensor 400 to assist in the perception of visual features of the object such as color and shape prior to contact.

FIG. 4B shows an STS sensor 400' with an external light source 440' according to an embodiment. The external light source 440' may be placed close to a contact surface of the STS sensor 440' to illuminate a sensor side of an object that is in close proximity to the STS sensor 440.

As shown in FIGS. 4A and 4B, the STS sensor may include a diffused light source 430 provided below the semitransparent membrane 410.

FIGS. 5A through 5D show embodiments of semitransparent membranes that may be included in STS sensors according to other embodiments. The semitransparent membranes of FIGS. 5A through 5D cover a portion of the membrane with an opaque material an leave the remainder transparent to provide the STS. While operating the membranes of FIGS. 5A through 5D, the tactile mode may be provided by imaging the opaque portions of the membrane and the visual mode may be provided by imaging the light emitted through the transparent portions.

Figure 6A:
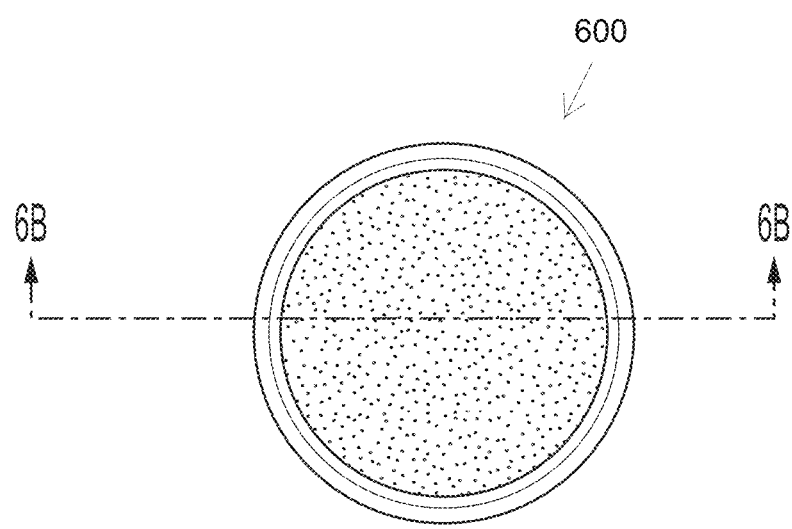
FIG. 6A shows a semitransparent membrane that may be included in an STS sensor according to another embodiment.
Figure 6B:
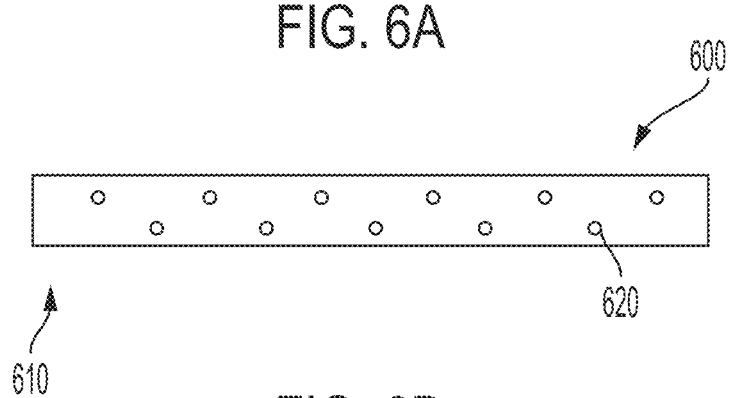
FIG. 6B shows a cross-section of the semitransparent membrane of FIG. 6A taken along line 6B.

FIGS. 6A and 6B show a semitransparent membrane of an STS sensor according to another embodiment.

The contact membrane may include a transparent elastomer 610 with opaque markers 620 suspended in the elastomer to provide the STS. As shown in 6A, the opaque markers 620 may be spread apart relative to a contact surface of the elastomer 610. As shown in FIG. 6B, the opaque markers 620 may be spread apart throughout a depth of the elastomer 610. In other embodiments, the opaque markers 620 may be suspended at a constant depth within the elastomer 610. Both approaches have different benefits. Placing the markers 620 at a constant depth provides simplification in terms of modeling their distortion as a function of motion of the transparent elastomer 610. On the other hand, distributing the markers 620 throughout the elastomer 610 allows the modeling of gel distortion to make fewer assumptions about the rate at which the gel distorts through the depth of the gel.

An image sensor positioned below the semitransparent membrane 600 may capture the motion of the opaque markers 620 which may be used to capture distortions in the membrane 600 provided by a contacting object. Additionally, the transparent elastomer 610 may enable an image sensor provided below the membrane 600 to capture images of objects that are in the proximity of the sensor.

Figure 7:
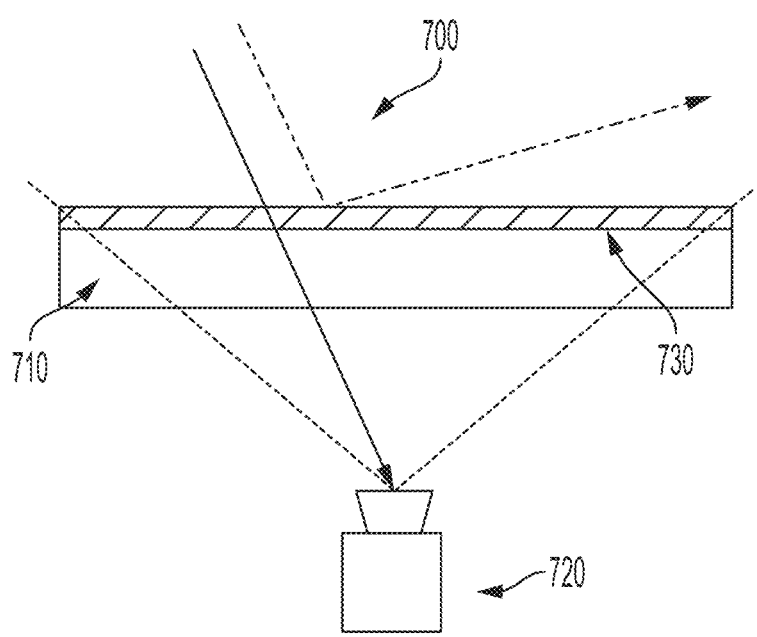
FIG. 7 is a diagram of an semitransparent membrane of an STS sensor according to another embodiment.

FIG. 7 is a diagram of an semitransparent membrane 700 of an STS sensor according to another embodiment.

The semitransparent membrane 700 may include a transparent elastomer 710 covered by a dichroic mirror 730 (color filter) which provides the STS. The dichroic mirror 730 may be transparent to some wavelengths of light while being reflective to others. An image sensor 720 mounted within the STS sensor may obtain a mixture of light passing through the semitransparent membrane 700 from the exterior environment and light reflected from the surface of the semitransparent membrane 700. These signals may be disentangled. A range of standard image processing technique can be used to separate these signals. For example, assuming that the semitransparent membrane 700 only passes red light and that it reflects blue, the chromatic channels from the camera may be separated into blue (tactile channel) and red (visual channel), and these channels may be processed accordingly. Illumination of the semitransparent membrane can be provided via blue illuminants while illumination of the visual channel can be provided by red illuminants.

According to another embodiment, a membrane of an STS sensor may be treated with a material whose opacity can be controlled electrically. There are a number of potential technologies that could be used, such as PDLC smart glass. PDLC smart glass or privacy glass is a material that changes from opaque to transparent based on the current applied to it. Such devices can change state up to speeds as high as 3 msec. By having a surface that can be controlled as being either fully opaque of fully transparent, time may be used as a mechanism to obtain semi-transparency by cycling the states of the surface.

Figure 8:
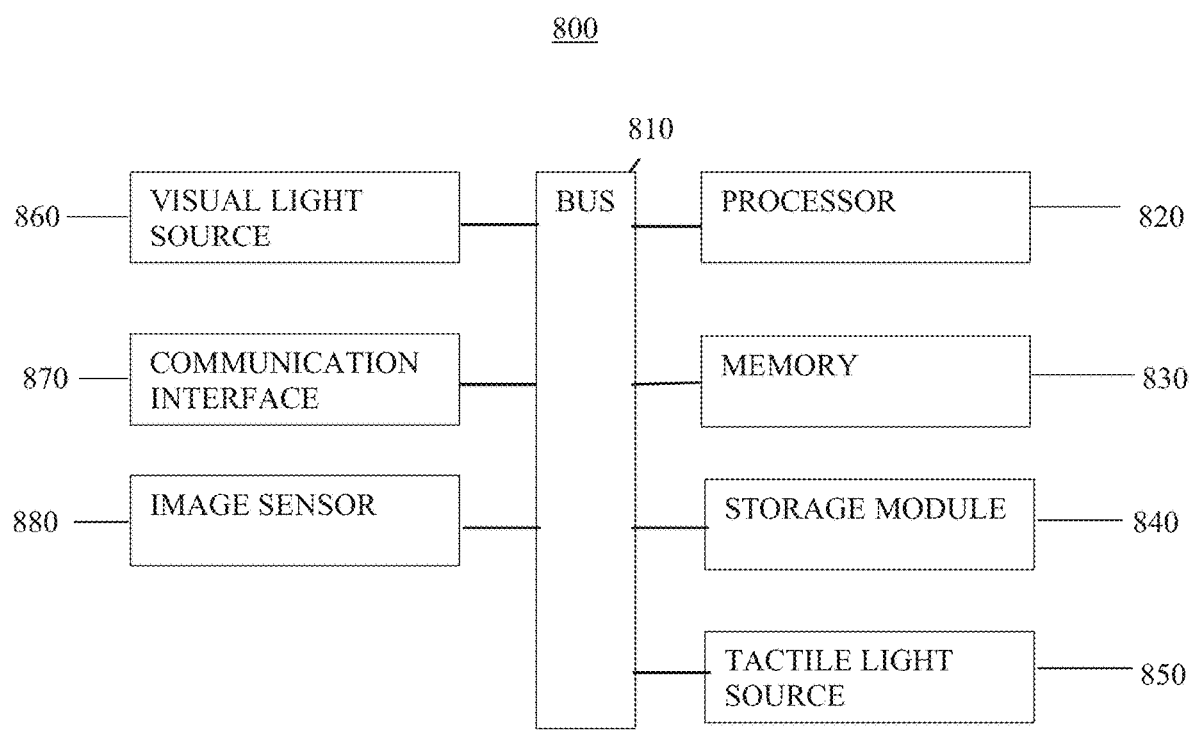
FIG. 8 is a diagram of example components of an STS sensor according to an embodiment.

FIG. 8 is a diagram of example components of an STS sensor according to an embodiment. As shown in FIG. 2, the STS sensor 800 may include a bus 810, a processor 820, a memory 830, a storage module 840, a tactile light source 850, and a visual light source 860, a communication interface 870, and an image sensor 880.

The bus 810 may include a component that permits communication among the components of the STS sensor 800. The processor 820 may be implemented in hardware, firmware, or a combination of hardware and software. The processor 820 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 820 may include one or more processors capable of being programmed to perform a function. The memory 830 may include a random access memory (RAM), a read only memory (ROM), and/or another type of dynamic or static storage device (e.g., a flash memory, a magnetic memory, and/or an optical memory) that stores information and/or instructions for use by the processor 820.

The storage module 840 may store information and/or software related to the operation and use of the STS sensor 800. For example, the storage module 840 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

A tactile light source 850 may be controlled by the processor 820 to illuminate an internal structure of the STS sensor. A visual light source 860 may be controlled by the processor 820 to illuminate an object in close proximity to the STS sensor. The processor 820 may control the tactile light source 850 and visual light source 860 in an alternating or inverse manner. That is, the processor 820 may control the tactile light source 850 to be on while the visual light source 860 is off, and vis versa.

The communication interface 870 may include a transceiver-like component (e.g., a transceiver and/or a separate receiver and transmitter) that enables the STS sensor 800 to communicate with other devices, such as via a wired connection, a wireless connection, or a combination of wired and wireless connections. The communication interface 870 may permit the STS sensor 800 to receive information from another device and/or provide information to another device. For example, the communication interface 870 may include an Ethernet interface, an optical interface, a coaxial interface, an infrared interface, a radio frequency (RF) interface, a universal serial bus (USB) interface, a Wi-Fi interface, a cellular network interface, or the like.

The STS sensor 800 may perform one or more processes described herein. The STS sensor 800 may perform these processes in response to the processor 820 executing software instructions stored by a non-transitory computer-readable medium, such as the memory 830 and/or the storage module 840. A computer-readable medium is defined herein as a non-transitory memory device. A memory device includes memory space within a single physical storage device or memory space spread across multiple physical storage devices.

Software instructions may be read into the memory 830 and/or the storage module 840 from another computer-readable medium or from another device via the communication interface 870. When executed, software instructions stored in the memory 830 and/or the storage module 840 may cause the processor 820 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

An image sensor 880 may capture images of an internal side or bottom of the STS when the tactile light source is emitting light. The image sensor may capture an object in close proximity to the STS sensor 800, through the STS, when the visual light source is emitting light. The signals produced by the image sensor may be processed by the processor 820 and stored in the memory 830 or storage module 840.

The number and arrangement of components shown in FIG. 8 are provided as an example. In practice, the STS sensor 800 may include additional components, fewer components, different components, or differently arranged components than those shown in FIG. 8. Additionally, or alternatively, a set of components (e.g., one or more components) of the STS sensor 800 may perform one or more functions described as being performed by another set of components of the STS sensor 800.

Figure 9:
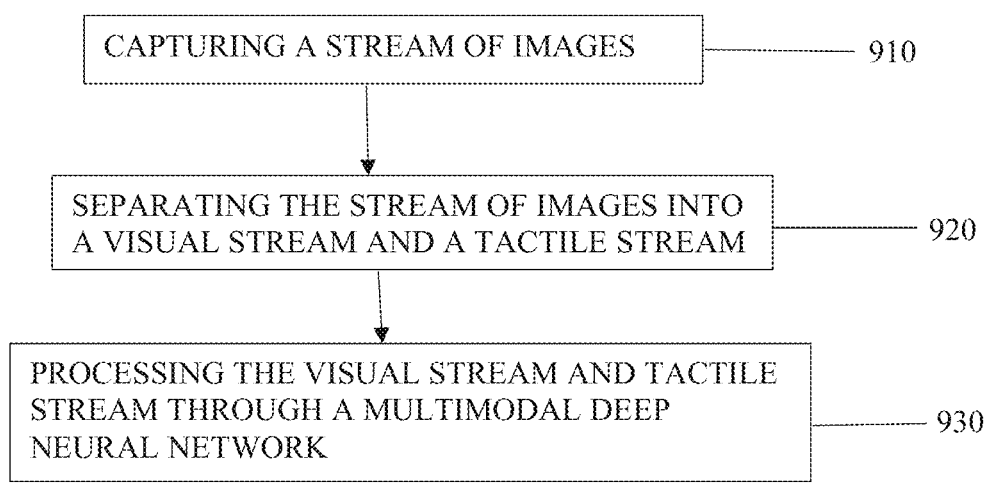
FIG. 9 is a flowchart of a method of sensing an interaction with an object using an STS sensor according to an embodiment.

FIG. 9 is a flowchart of a method 900 of sensing an interaction with an object using an STS sensor according to an embodiment. The STS sensor may include an image sensor directed at an inner surface of an semitransparent membrane. An outer surface of the semitransparent membrane may interact with the object.

At operation 910, a stream of images may be captured by the image sensor. The image stream may primarily capture light transmitted through the semitransparent membrane when the STS sensor is in a visual mode and the image stream may primarily capture light reflected off of the semitransparent membrane when the STS sensor is in a tactile mode.

At operation 920, the stream of images may be separated into a visual stream and a tactile stream. The visual stream may visually capture the object by primarily sensing light transmitted through the semitransparent membrane. The tactile stream may capture deformation of the semitransparent membrane caused by the object by sensing light reflected off of the semitransparent membrane.

The tactile stream may be captured during time periods when the STS sensor is in a tactile mode and the visual stream may be captured during time periods when the STS sensor is in a visual mode. The time periods of the tactile mode and the time periods of the visual mode may be inversely related.

According to an embodiment, the STS sensor may be in a tactile mode when tactile lights, which may emit light that primarily reflects off of the semitransparent membrane towards the image sensor, are emitting light. The STS sensor may be in a visual mode when visual lights, which may primarily emit light through the semitransparent membrane, are emitting light.

At operation 930, the visual stream and tactile stream may be processed by a multimodal deep neural network.

According to an embodiment, the multimodal deep neural network may process the visual stream and the tactile streams through individual convolutional neural networks to analyze the image streams. The outputs of the individual convolutional neural networks may be concatenated and fed into a fully connected neural network. The fully connected neural network may include a final softmax layer that predicts the identity and class of the object. Non-limiting examples of network architecture may include Resnet, ResnetXT, InceptionV3, Xception.

According to an embodiment, the multimodal neural network may predict an identity the object, a proximity of the object to the STS sensor, and a three-dimensional shape of the object based on the visual stream, and may predict contact forces, contact geometry, and texture of the object based on the tactile stream. The multimodal neural network may also estimate a pose of the object.

According to an embodiment, the STS sensor may detect contact with the object. Based on contact with the object not being detected, the 3D pose of the object may be estimated based on the visual stream. Based on contact with the object being detected, the 3D pose of the object may be estimated based on the visual stream and the tactile stream.

A future configuration of the object may be predicted by the multimodal neural network. Predicting the future configuration of the object may include encoding at least one image of the visual stream, at least one image of the tactile stream, and at least one estimated 3D pose. A Product of Experts (PoE) technique may be used to combine the encoded at least one image of the visual stream, the encoded at least one image of the tactile stream, and the encoded at least one estimated 3D pose of the object. The results of the PoE may be used to predict a future visual image of the object, a future tactical image of the objects interaction with the semitransparent membrane, and a future pose of the object.

Figure 10:
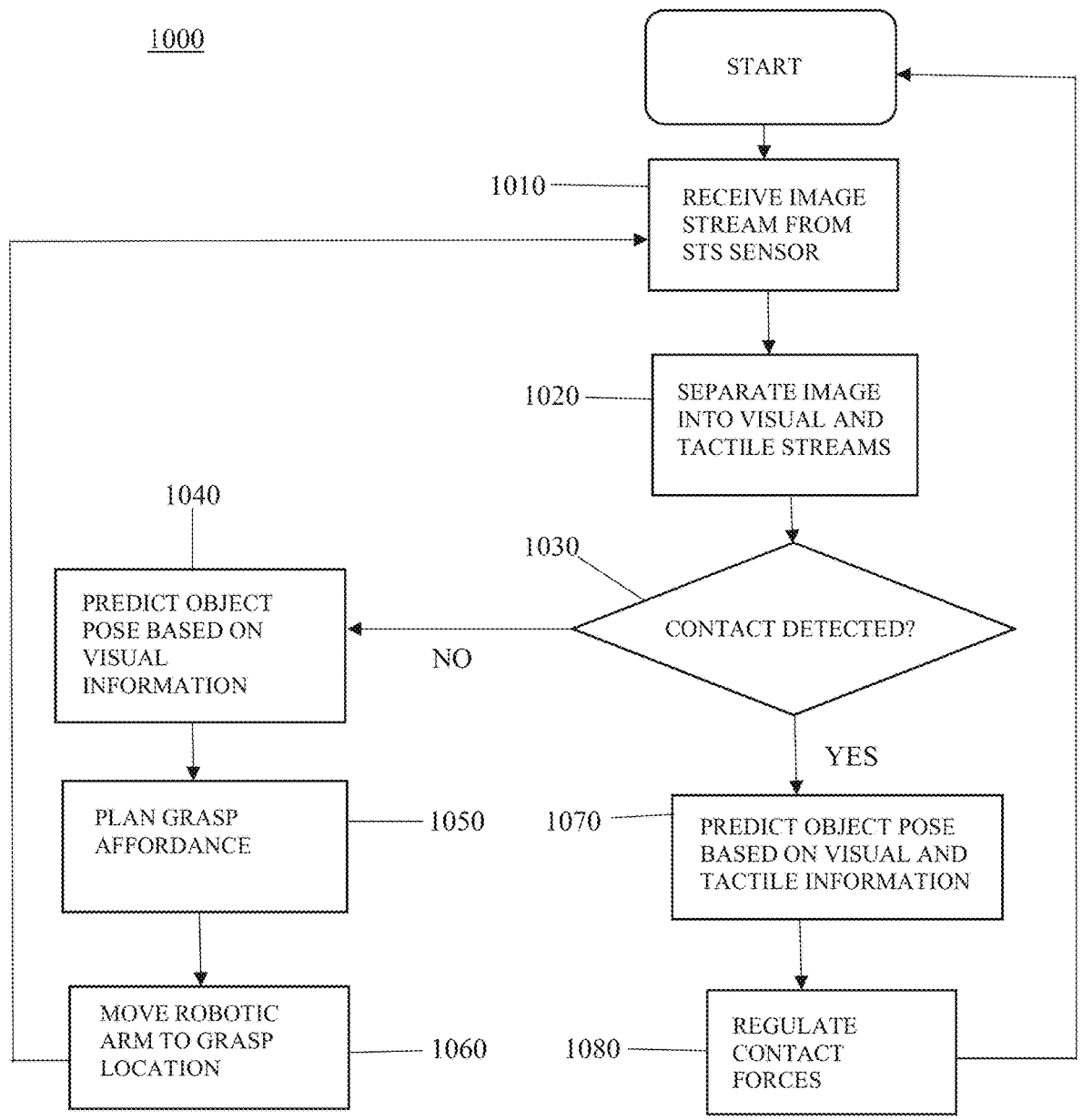
FIG. 10 is a flowchart showing a method for precise grasping of an object by a robotic arm according to an embodiment.

FIG. 10 is a flowchart showing a method 1000 for precise grasping of an object by a robotic arm according to an embodiment.

At operation 1010, an image stream is received from an STS sensor on the grasper. This operation may be similar to operation 910.

At operation 1020, the image stream may be separated into a visual stream and a tactile stream. This operation may be similar to operation 920.

At operation 1030, the STS sensor may determine if contact with the object is detected.

If contact is not detected, at operation 1040, an object pose may be predicted based on the visual stream. At operation 1050, the robotic device may plan grasping motion based on the predicted pose of the object. At operation 1060, the robotic arm may be moved to the grasping location. After operation 1060, the method may proceed back to operation 1010.

If contact is detected in operation 1030, at operation 1070, a pose of the object may be predicted based on the visual stream and the tactile stream. At operation 1080, contact forces between the gripper and object may be regulated based on the pose predicted in operation 1070. After operation 1080, the method 100 may proceed back to the start.

Figure 11:
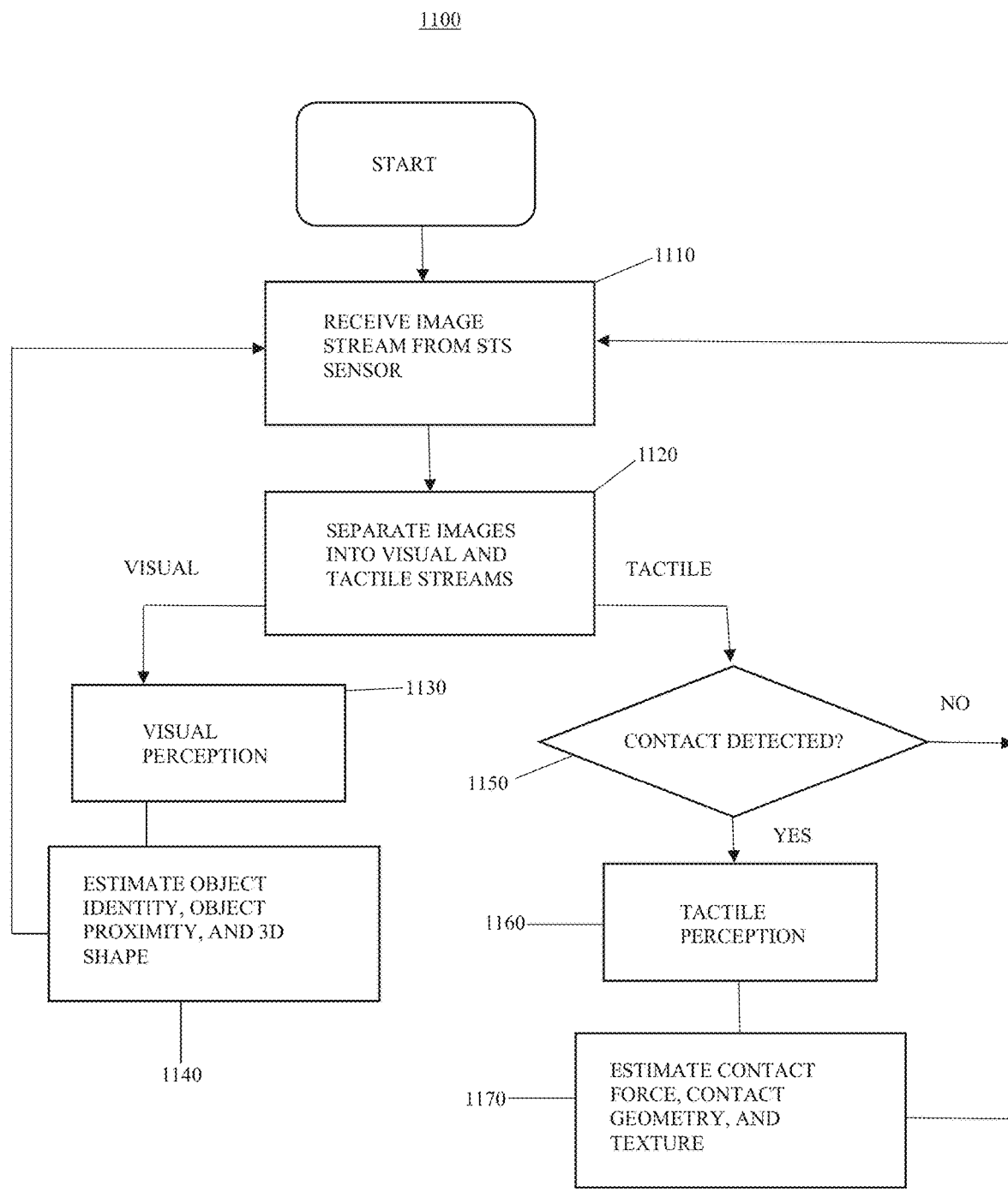
FIG. 11 is a flowchart of an object recognition method using an STS sensor according to an embodiment.

FIG. 11 is a flowchart of an object recognition method using an STS sensor according to an embodiment. The method 1100 of FIG. 11 may be used to provide a smart kitchen countertop that can interact with and react to actions taken by a user, as well as the devices that would benefit from similar functionality.

At operation 1110, an image stream may be received from an STS sensor. This operation may be similar to operation 910.

At operation 1120, the image stream may be separated into a visual stream and a tactile stream. This operation may be similar to operation 920.

At operation 1130, visual perception may be performed using a first neural network. At operation 1140, the first neural network may predict an identity of the object, a proximity of the object, and a 3D shape of the object.

At operation 1150, contact between the object and STS sensor may be detected. If contact is detected, at operation 1160, tactile perception may be performed using a second neural network. At operation 1170, contact forces between the object and STS sensor, contact geometry of the interaction between the object an STS sensor, and texture of the object may be estimated by the second neural network.

Unlike the method of FIG. 10, the method of FIG. 11 may predict visual and tactile characteristics separately by two independent neural networks.

Figure 12:
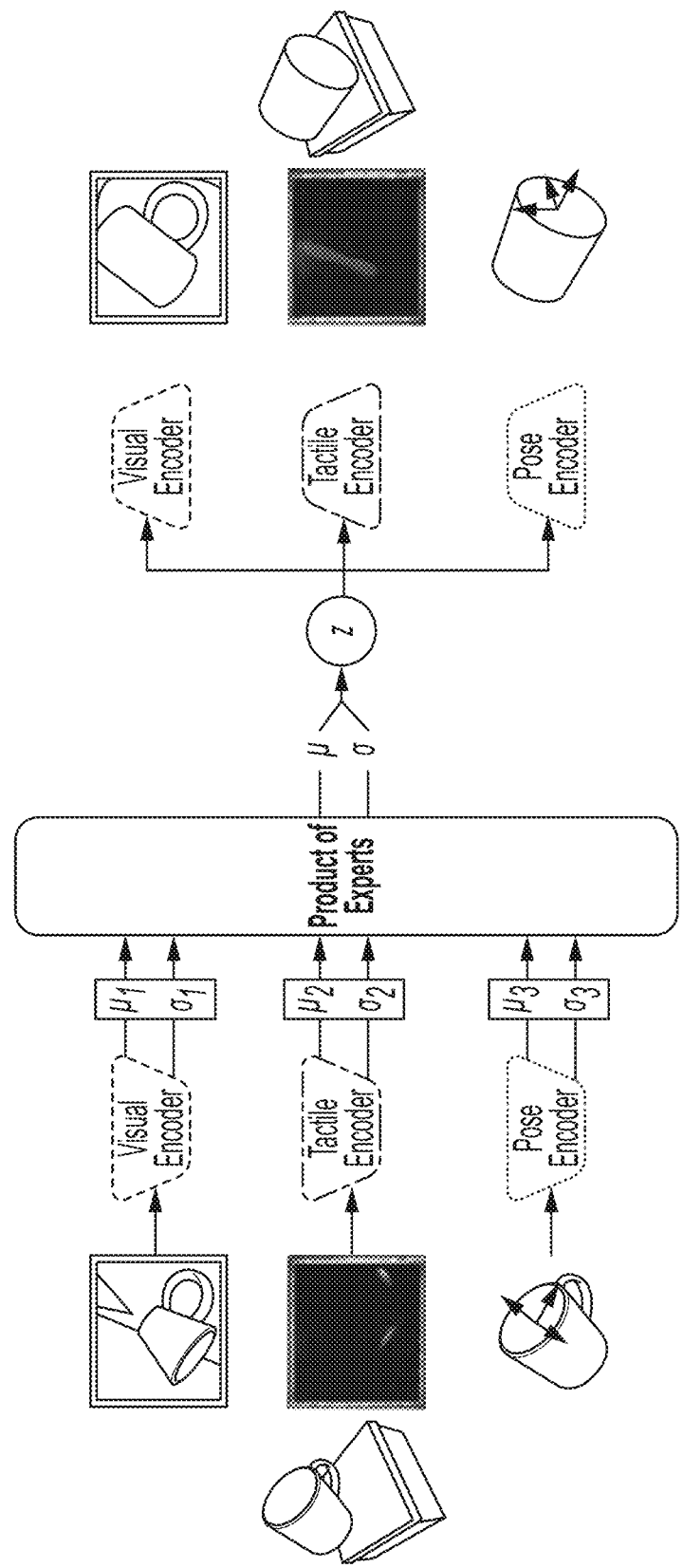
FIG. 12 is a diagram of a general perceptive system that integrates visual, tactile, and 3D pose feedback within a unified Multimodal Variational Autoencoder (MVAE) framework to predict a future configuration of an object, according to an embodiment.

FIG. 12 is a diagram of a general perceptive system that integrates visual, tactile, and 3D pose feedback within a unified Multimodal Variational Autoencoder (MVAE) framework to predict a future configuration of an object, according to an embodiment.

The MVAE architecture may learn a representation that encodes key information about objects such as shape, color, and interaction forces, necessary to make inferences about intuitive physics (i.e., the way in which an object will come to rest in response to an applied perturbation). The predicted outcome of a dynamic scene can be formulated as a self-supervision problem, where the target visual and tactile images are generated given observed context frames. The objective is to learn a generator that maps the current available observations to the predicted configuration of the resting object.

As shown in FIG. 12, the network obtains the current object configuration to predict the object's future configuration. The variable auto encoder uses an inference network to map the observations to a latent space, followed by a decoder to map the latent variables back to the observation space. Approaches such as PoE can be used to efficiently learn the approximate joint posterior of different modalities as the product of individual posteriors of each modality which are represented in equation (1) below.

$$p_\theta(x_1, \ldots, x_N, z) = p(z) p_\theta(x_1|z) \ldots p_\theta(x_N|z) \quad (1)$$

where $x_i$ denotes the observation associated with mode i, N is the total number of available modes, and z is the shared latent space. Assuming conditional independence between modalities the joint posterior can be written as equation (2) below:

$$p(z|x_1, \ldots, x_N) = \frac{\prod_{i=1}^{N} p(z|x_i)}{\prod_{i=1}^{N-1} p(z)}. \quad (2)$$

By approximating $P(z|x_i)$ in equation (2) with $q(z|x_i) \equiv q(z|x_i)p(z)$, where $q(z|x_i)$ is the inference network of modality i, the following equation (3) may be obtained which is recognized as a PoE:

$$p(z|x_1, \ldots, x_n) \propto p(z) \Pi_{i=1}^{N} q(z|x_i) \quad (3)$$

In a case of variational autoencoders where $p(z)$ and $q(z|x_i)$ are multivariate Gausians, the PoE can be computed analytically, as the product of Gaussians is itself a Gaussian.

An unlike other multimodal generative models, the MVAE can be efficiently scaled up to several modalities, as it requires training only N inference models rather than the $2^N$ multimodal inference networks. Additionally, PoE allows for continuous inference in the case of discontinuous and unavailable modalities.

According to an embodiment, the MVAE framework may be used to learn a shared representation that exploits multiple sensing modalities for learning the underlying dynamics of intuitive physics. This formulation allows for sensing modalities to be combined, while naturally handling with intermittent contact events, where tactile measurements are discontinuous. While variational autoencoders are traditionally trained by reconstructing the inputs to the encoder, a time-lag element is introduced into the network architecture, where the outputs of the decoder are set to predict future frames, evidence lower bound loss may be adopted to provide the following equation (4):

$$\text{ELBO}(x_t, x_T) \triangleq E_{q_\Theta(z|x_t)}[\lambda \log p_\theta(x_T|z)] - \beta KL(q_\Theta(z|x_t) \| p_\theta(z)) \quad (4)$$

The first term denotes the reconstruction loss measuring the expectation of the likelihood of the reconstructed data given the latent variables and the second term is the Kullback-Leibler divergence between the approximate and true posterior and acts as a regularization term. In order to regularize the terms in the ELBO loss, $\beta$ and $\lambda$ are used as weights. t denotes initial time and T denotes final time.

FIG. 12 shows an example of a dynamics model learning framework, where three modalities of visual, tactile, and 3D poses are fused together to learn a shared embedding space via three uni-modal encoder-decoders connected through the PoE. In order to obtain the training loss of the model, an embodiment may follow the sampling methodology, where the ELBO loss is computed by enumerating the subsets of the modalities M={visual; tactile; pose} as shown in equation (5) below:

$$L(x_t) = \Sigma_{X \in P(M)} \text{ELBO}(X_t, X_t) \quad (5)$$

where P(M) is the powerset of the modalities set M.

The system of FIG. 12 may operate without each of the visual, tactile, and 3D pose being input. For example, when the STS sensor is not in contact with an object, only visual and 3D pose may be input. Based on these inputs, the system of FIG. 12 may output a predicted future visual image and a predicted future 3D pose.

Figure 13:
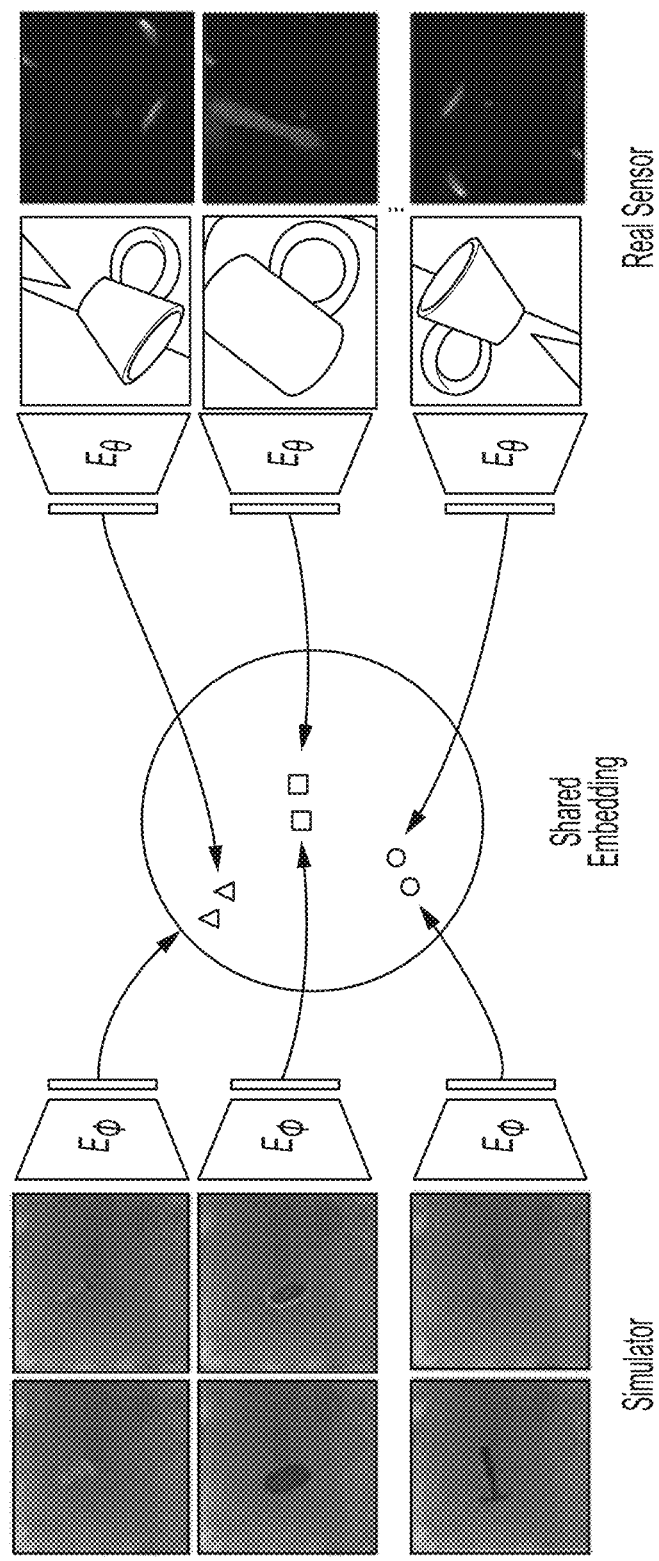
FIG. 13 is a diagram of a transfer learning process that maps both simulated images produced by an STS simulator and real world images produced by an STS sensor according to an embodiment.

FIG. 13 is a diagram of a transfer learning process that maps both simulated images produced by an STS simulator and real world images produced by an STS sensor according to an embodiment.

While deep learning methods are effective at processing the image based measurements provided by the STS sensor, two real-world challenges, data collection and transfer learning, must be overcome. In order to assist with the generation of data, the STS simulator may be provided to rendering realistic visuotactile imprints.

This simulator may be used to test the STS sensors ability to recognize objects, to explore the best way of encoding data from the STS sensor, and gain intuition regarding the importance of visual versus tactile information for this task. The simulator may map the geometric information about the object in collision with the sensor. The simulator may develop a compliance model that is approximated by modeling the geometric information with an array of springs (one per pixel), and solving for static equilibrium at each time step, given the known contact geometry and reactive forces from the simulator. The simulator may be used to train AI algorithms within a Sim2Real machine learning framework.

While rendering realistic visuotactile imprints by the simulator, measurements of the simulated imprints may be different than measurements obtained using the real STS sensor. To address this, transfer learning algorithms that map both the simulated and real-world images to a shared embedding, can be effective to train algorithms that can deal with the distribution mismatch between the real and simulated images. Examples include but are not limited to a variational autocoender to find a shared embedding space (as shown in FIG. 13), weight initialization, layer freezing, and elastic weight consolidation.

Figure 14:
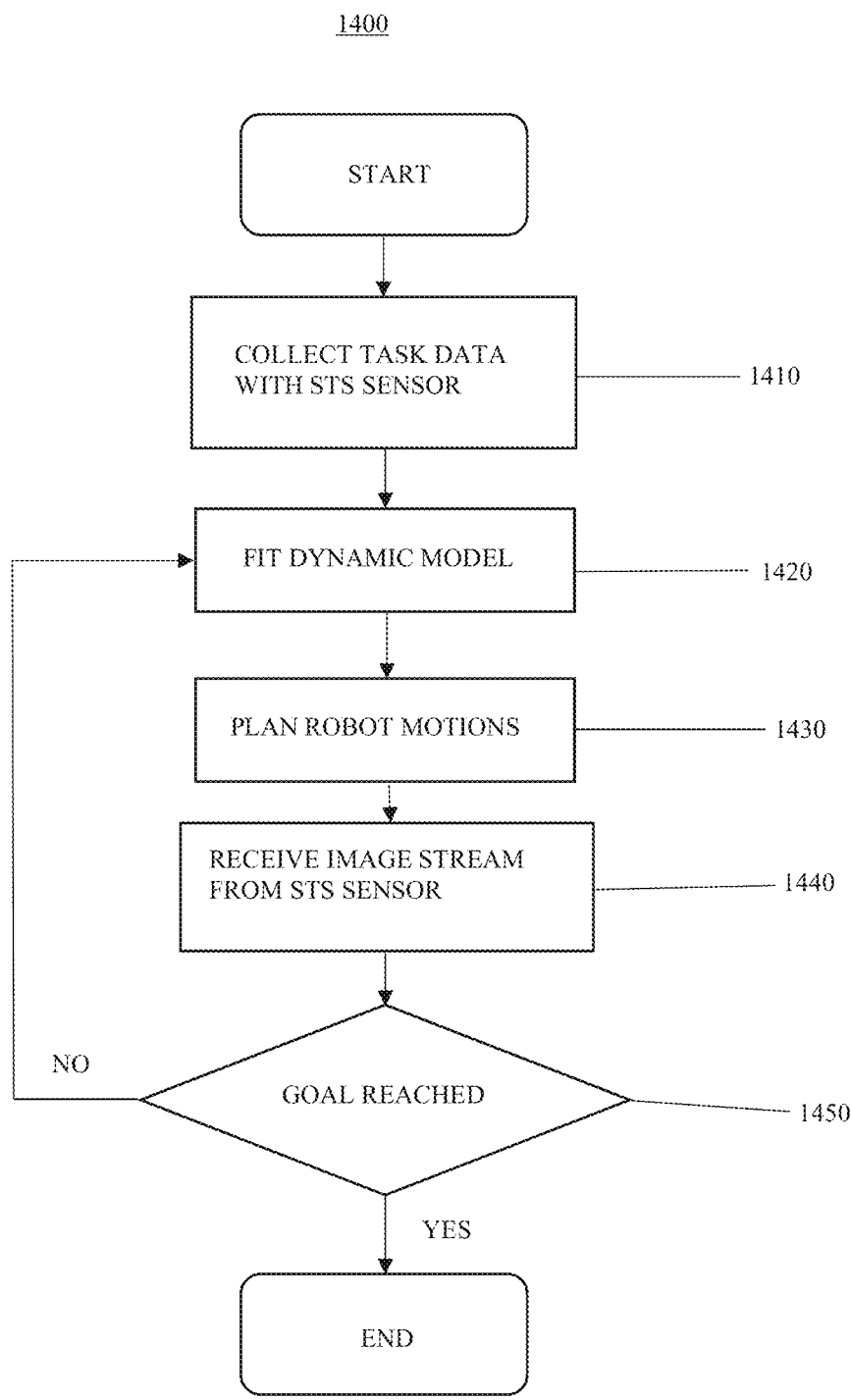
FIG. 14 is a flowchart of a reinforced learning algorithm 1400 that utilizes sensor information from an STS sensor to accomplish a robotic task according to an embodiment.
Figure 15:
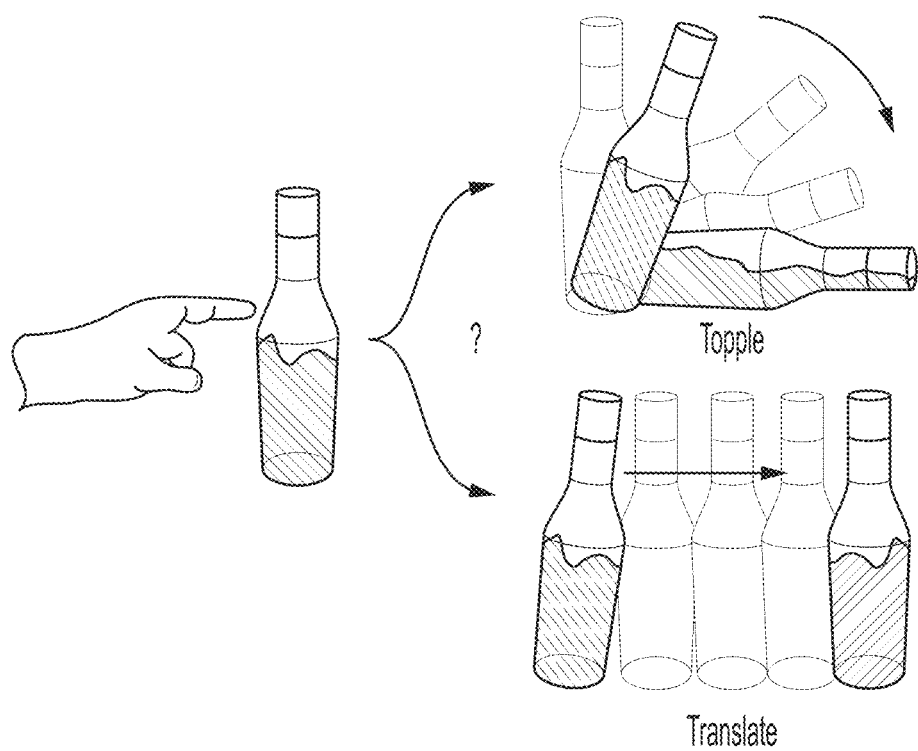
FIG. 15 is a diagram showing possible outcomes of a physical interaction with an object.

FIG. 14 is a flowchart of a reinforced learning algorithm 1400 that utilizes sensor information from an STS sensor to accomplish a robotic task according to an embodiment.

At operation 1410, the algorithm 1400 collects task data regarding an object with an STS sensor.

At operation 1420, a dynamics model is fit to the collected task data.

At operation 1430, robot motions are planned based on the output of the dynamics model.

At operation 1440, an image stream is received from the STS sensor.

At operation 1450, the algorithm determines if the goal of the task was reached based on the received image stream. If the goal was not reached, the algorithm proceeds back to operation 1420.

According to one or more example embodiments, the STS sensor may be integrated into robotic grippers that enable robot end effector with the sense of touch and a visual point of view from the perspective of the robot fingers.

To secure a good grasp of an object, it is important for the robotic device to have a clear and unobstructed view of the object. This is exacerbated when using a robot with multiple fingers, where the fingers are likely to be far away from the camera positioned on the wrist. During the grasp, the robot hand will have to rely solely on tactile sensing. The benefit of having the camera integrated within the robotic fingers, as provided by the STS sensor, is twofold. First, when approaching the object, we get a clear and unobstructed view of the object that we are about to grasp. Second, the more fingers the hand has, the richer the visual signal, as opposed to the wrist mounted camera configuration, where each additional finger becomes an obstacle likely to occlude the view. During the grasp, both visual servoing and tactile sensing can be used to manipulate the object to a desired configuration.

Performing precise grasps on small objects is a common task found in assembly lines, manufacturing lines, and service robotics. For such tasks, the STS sensor enables the robot to place its fingers around the object while performing visual servoing. As the object is grasped, the tactile sensors provide feedback on the precise location of the part, permitting the robot to manipulate it as desired, for example by inserting a key into its slot, or manipulating cables into their respective location. While the camera in the wrist configuration can in principle accomplish this task when used in tandem with tactile sensors, it is very difficult to construct a good point cloud registration of the entire object from a single viewpoint. Due to this, the robot typically performs a slow visual recognition task prior to manipulating the object, by moving around the object to grasp. With the STS sensor, the small object can be approached while maintaining a clear view of it, without necessitating additional robot motions. The flowchart of FIG. 10 describing how the sensing modalities are used to accomplish precise manipulation tasks according to an embodiment.

The camera in the wrist configuration is possible when the object remains stationary in the world. By performing an initial reconnaissance maneuver, the robot moves its wrist to locate the object, after which it approaches the object assuming that it has not moved. For dynamic tasks, including the human-machine interactions such as in-hand manipulation, handle manipulation, tool use, etc., the object being manipulated might be displaced since the moment it had been localized. For such tasks, robots requires a direct line of sight to be maintained with the object during the manipulation process. This is made possible with a the STS sensor where the camera is located within the robotic fingers.

For many robotic tasks, including the manipulation of handles (doors, cabinets, appliances, etc.), the camera on wrist configuration only provides a partial observation (pointcloud) of the object that we want to manipulation and often is too large to fit within small and closed spaces. The STS sensor affords the robot another set of eyes that can be accurately controlled anywhere in the environment and can provide the robot with the missing visual information. This is crucially important as the camera mounted on the wrist is too large to fit in the small spaces where we wish to place the robot fingers.

According to one or more example embodiments, the STS sensor may be provided over interaction surfaces for appliances and home electronics to allow users a wide range of modalities. For example, individual detection from STS sensors may be used to provide secure door locks that can recognize users. In another embodiment, STS sensor may be used in smart earbuds that can detect normal and shear forces, as well as hand gestures.

According to one or more example embodiments, STS sensors could be integrated into automotive controllers (e.g., door knob, steering wheel, others) to provide both individual recognition for security and device operation customization, as well as detecting physical ability to operate the vehicle (e.g., tremors).

According to one or more example embodiments, STS sensors may be used to diagnose conditions which manifest themselves in both visual and haptic space (e.g., certain cancers), as well as in guiding of robotic medical devices.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A method of sensing an interaction with an object using a semitransparent tactile surface (STS) sensor including an image sensor and a semitransparent membrane, the method comprising:
    capturing, by the image sensor, a stream of images;
    separating the stream of images into a visual stream comprising light traveling through the semitransparent membrane and a tactile stream comprising light reflecting off of the semitransparent membrane; and
    processing the visual stream and tactile stream through a multimodal deep neural network.

2. The method of claim 1, wherein processing the visual stream and tactile stream through the multi-modal deep neural network comprises inputting the visual stream and tactile stream into individual convolutional neural networks, concatenating outputs of the individual convolutional neural networks, and feeding the concatenated outputs into a fully connected neural network.

3. The method of claim 2, further comprising predicting an identity and class of the object, wherein the fully connected network predicts the identity and class of the object using a final softmax layer.

4. The method of claim 1, wherein processing the visual stream and tactile stream through the multi-modal deep neural network comprises:
    predicting an identity of the object, a proximity of the object, and a three-dimensional shape of the object based on the visual stream; and
    predicting contact forces, contact geometry, and texture of the object based on the tactile stream.

5. The method of claim 1, further comprising detecting contact with the object,
    wherein the processing the visual stream and tactile stream through a multimodal deep neural network comprises estimating a three-dimensional (3D) poses of the object,
    wherein, based on contact with the object not being detected, the 3D pose of the object is estimated based on the visual stream, and
    wherein, based on contact with the object being detected, the 3D pose of the object is estimated based on the visual stream and the tactile stream.

6. The method of claim 5, wherein processing the visual stream and tactile stream through a multimodal deep neural network further comprises:
    encoding at least one image of the visual stream;
    encoding at least one image of the tactile stream;
    encoding at least one estimated 3D pose of the object; and
    predicting a future configuration of the object by combining the encoded at least one image of the visual stream, the encoded at least one image of the tactile stream, and the encoded at least one estimated 3D pose of the object using a product of experts technique.

7. The method of claim 1, wherein the STS sensor further includes a tactile light source and a visual light source,
    wherein the tactile stream is captured during time periods where the tactile light source emits light; and
    wherein the visual stream is captured during time periods where the visual light source emits light.

8. The method of claim 7, wherein the time periods of light emitted from the tactile light source and the time periods of the light emitted from the visual light source are inversely related.

9. A robotic device comprising:
    a semitransparent tactile surface (STS) sensor comprising an image sensor and a semitransparent membrane;
    a memory sorting instructions; and
    a processor configured to execute the instructions to:
        capture, by the image sensor, a stream of images;
        separate the stream of images into a visual stream comprising light traveling through the semitransparent membrane and a tactile stream comprising light reflecting off of the semitransparent membrane; and
        process the visual stream and tactile stream through a multimodal deep neural network.

10. The method of claim 9, wherein the processor is further configured to input the visual stream and tactile stream into individual convolutional neural networks, concatenating outputs of the individual convolutional neural networks, and feeding the concatenated outputs into a fully connected neural network.

11. The method of claim 10, wherein the processor is further configured to predicting an identity and class of the object, and
    wherein the fully connected network predicts the identity and class of the object using a final softmax layer.

12. The method of claim 9, wherein the processor is further configured to:
    predicting an identity of the object, a proximity of the object, and a three-dimensional shape of the object based on the visual stream; and
    predicting contact forces, contact geometry, and texture of the object based on the tactile stream.

13. The method of claim 9, wherein the processor is further configured to detect contact with the object and estimate a three-dimensional (3D) poses of the object,
    wherein, based on contact with the object not being detected, the 3D pose of the object is estimated based on the visual stream, and
    wherein, based on contact with the object being detected, the 3D pose of the object is estimated based on the visual stream and the tactile stream.

14. The method of claim 13, wherein the processor is further configured to:
    encode at least one image of the visual stream;
    encode at least one image of the tactile stream;
    encode at least one estimated 3D pose of the object; and
    predict a future configuration of the object by combining the encoded at least one image of the visual stream, the encoded at least one image of the tactile stream, and the encoded at least one estimated 3D pose of the object using a product of experts technique.

15. The method of claim 9, wherein the STS sensor further comprises a tactile light source and a visual light source,
    wherein the tactile stream is captured during time periods where the tactile light source emits light; and
    wherein the visual stream is captured during time periods where the visual light source emits light.

16. The method of claim 15, wherein the time periods of light emitted from the tactile light source and the time periods of the light emitted from the visual light source are inversely related.

17. A non-transitory computer readable medium storing instructions, the instructions comprising one or more instructions that, when executed by one or more processors of a robotic device including a semitransparent tactile surface (STS) sensor, cause the one or more processors to:

capture, by an image sensor of the STS sensor, a stream of images;

separate the stream of images into a visual stream comprising light traveling through a semitransparent membrane of the STS sensor and a tactile stream comprising light reflecting off of the semitransparent membrane; and process the visual stream and tactile stream through a multimodal deep neural network.

18. A semitransparent tactile surface (STS) sensor comprising:

a transparent gel layer having an upper surface and a lower surface;

a semitransparent layer disposed on the upper surface of the transparent gel layer;

a tactile light source provided below the semitransparent layer, the semitransparent layer being configured to reflect light emitted by the tactile light source;

a visual light source configured to emit light to an object provided above the semitransparent layer, the semitransparent layer being configured to transmit light emitted by the visual light source; and an image sensor provided below the transparent gel layer, wherein the image sensor is configured to capture images of the semitransparent layer during periods of light emission by the tactile light, and the image sensor is configured to capture images through the semitransparent layer during periods of light emission by the visual light source.

19. A method of operating a semitransparent tactile surface (STS) sensor including an image sensor, a semitransparent membrane, a tactile light source, and a visual light source, the method comprising:

periodically emitting light from the tactile light source, the semitransparent membrane being configured to reflect the light emitted by the tactile light source;

periodically emitting light from the visual light source, the semitransparent membrane being configured to pass the light emitted by the visual light source;

during time periods where the tactile light source emits light, capturing, by the image sensor, a tactile image stream comprising light reflecting off of the semitransparent membrane; and during time periods where the visual light source emits light, capturing, by the image sensor, a visual image stream comprising light traveling through the semitransparent membrane, wherein the time periods of light emitted from the tactile light source and the time periods of the light emitted from the visual light source are inversely related.

* * * * *